United States Patent
Dillahunt et al.

(10) Patent No.: US 9,159,088 B2
(45) Date of Patent: Oct. 13, 2015

(54) GENERATING A LOCATION-AWARE PREFERENCE AND RESTRICTION-BASED CUSTOMIZED MENU

(75) Inventors: Tawanna R. Dillahunt, Pittsburgh, PA (US); Peter K. Malkin, Ardsley, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 13/173,765

(22) Filed: Jun. 30, 2011

(65) Prior Publication Data

US 2013/0006802 A1 Jan. 3, 2013

(51) Int. Cl.
G06Q 30/00 (2012.01)
G06Q 30/02 (2012.01)
G06Q 30/08 (2012.01)

(52) U.S. Cl.
CPC ........ *G06Q 30/0281* (2013.01); *G06Q 30/0261* (2013.01)

(58) Field of Classification Search
CPC ............................... G06Q 30/06; G06Q 30/08
USPC .................................................. 705/26.1, 27.1
See application file for complete search history.

(56) References Cited

U.S. PATENT DOCUMENTS

| | | | | |
|---|---|---|---|---|
| 6,980,999 | B1 * | 12/2005 | Grana | 707/803 |
| 2012/0094258 | A1 * | 4/2012 | Langheier et al. | 434/127 |
| 2012/0109688 | A1 * | 5/2012 | Yoo | 705/3 |

OTHER PUBLICATIONS

New obesity research presented by temple faculty, us fed news Service, Including US State News [Washington, D.C] Nov. 22, 2006: n/a. Downloaded from ProQuestDirect on the Internet on Mar. 21, 2013. 3 pages.*

New Web site helps promote healthy eating, McCollum, Kelly, The Chronicle of Higher Education43. 28 (Mar 21, 1997): A31. Downloaded from ProQuestDirect on the Internet on Mar. 21, 2013. 1 page.*

Allrecipes.com Takes the Guesswork Out of Healthy Eating With the Launch of Nutri-Planner, PR Newswire [New York] Apr. 7, 2003: 1. Downloaded from ProQuestDirect on the Internet on Mar. 21, 2013. 3 pages.*

Menu options Chowhound.com message boards are full of valuable suggestions for eating well when you travel, Koff, Stephen, Plain Dealer [Cleveland, Ohio] Mar. 8, 2009: F.1. Downloaded from ProQuestDirect on the Internet on Mar. 21, 2013. 4 pages.*

Foodie Web site helps restaurants talk to diners, Weigl, Andrea. McClatchy—Tribune Business News [Washington] Dec. 30, 2009. Downloaded from ProQuestDirect on the Internet on Mar. 21, 2013. 3 pages.*

Top iPhone Apps for Health Pros, Patients, Anonymous. Informationweek—Online (Oct 26, 2009). Downloaded from ProQuestDirect on the Internet on Mar. 21, 2013, 6 pages.*

(Continued)

*Primary Examiner* — James Zurita

(74) *Attorney, Agent, or Firm* — Scully, Scott, Murphy & Presser, P.C.; Louis J. Percello, Esq.

(57) ABSTRACT

Location-aware preference and restriction based customized menu may be generated, for example, by obtaining a list of preferences and restrictions, tracking a dietary intake, determining a list of foods available at current location, and generating a list of recommended foods from the current location based on the list of preferences and restrictions, and the tracked dietary intake.

18 Claims, 3 Drawing Sheets

(56) References Cited

OTHER PUBLICATIONS

New Nutricate(TM) Receipt Helping Consumers Make Healthier Choices When Eating Out; Patented system gives consumers personalized nutritional information on receipt, PR Newswire [New York] Jun. 20, 2007: Downloaded from ProQuestDirect on the Internet on Mar. 21, 2013. 3 pages.*

Calorie Trackers: When a Kati Roll Is Like a Burrito, Wall Street Journal (Online) [New York, N.Y] Mar. 16, 2011: n/a. Downloaded from ProQuestDirect on the Internet on Mar. 21, 2013. 4 pages.*

PR Newswire [New York] Sep. 8, 2008, WebDiet(R) Launches First Service for Anytime Anywhere Healthy Eating; Combines GPS with Dietary Needs and Preferences: Location-Based Service (LBS) WebDiet Sends Customized Meal Suggestions at Time of Purchase, Based on Your Personal Health Needs, Favorite Foods & Current Location, 5 pages, downloaded from ProQu.* iPhone Atlas—CNET Reviews, iPhone app tracks your food intake by scanning bar codes, Sep. 24, 2009, http://reviews.cnet.com.

Lose it!, Succeed at weight loss with Lose It!, http://www.loseit.com.

iTunes Preview, Lose it! for iPhone, iPod touch, and iPad on the iTunes App Store, http://itunes.apple.com/lose-it/.

iTunes Preview, Nutrition Facts for iPhone, iPod touch, and iPad on the iTunes App Store, http://itunes.apple.com/us/app/nutrition-facts/.

* cited by examiner

GENERATING A LOCATION-AWARE PREFERENCE AND RESTRICTION-BASED CUSTOMIZED MENU

FIELD

The present application relates generally to computers, applications and user interfaces, and more particularly to generating a location-aware preference and restriction-based customized menu.

BACKGROUND

Classification is pervasive in today's world. For example, online advertisements are catered to individuals based on user search habits, content of user email, and click-through behavior. Users receive suggestions on what to purchase based on prior purchases. However, this technique has not been used for tangible recommendations such as what foods/drinks users should purchase. For example, when dining out, users may ask a server or friends for meal and/or drink suggestions. What if users were given suggestions based on the state of the users' salivary glands? The present disclosure describes a method for classifying the current state of a person's taste buds, salivary glands and/or blood stream and making food recommendations.

Known solutions include taking blood tests to determine foods to avoid, for example, for allergy reasons by identifying food allergies. For suggestions or recommendations on what meal entrees to select, options include accessing food sites and/or restaurant recommendation sites such as Yelp™, asking friends, family and/or staff members at food establishments for recommendations, or even going online for ideas.

BRIEF SUMMARY

A method and system of generating location-aware preference and restriction based customized menu may be provided. The method, in one aspect, may include obtaining a list of preferences and restrictions and tracking a dietary intake. The method may also include determining a list of foods available at current location, and generating a list of recommended foods from the current location based on the list of preferences and restrictions, and the tracked dietary intake.

A system for generating location-aware preference and restriction based customized menu, in one aspect, may include a module operable to obtain a list of preferences and restrictions associated with a user and further operable to track a dietary intake. The processor may be further operable to determine a list of foods available at current location, and generate a list of recommended foods from the current location based on the list of preferences and restrictions, and the tracked dietary intake.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one embodiment describes generating a customized menu based on user's current location, preferences and restrictions. For instance, a menu may be generated dynamically based a restaurant or another food establishment that the user is current at, and also considering restrictions such as the food allergies and other dietary restrictions associated with the user. The menu may be generated also based on one or more preferences the user may have.

In one embodiment of the present disclosure, a user's food allergy may be dynamically determined at the user current location by sampling. For instance, a person's mouth may be classified based on a saliva sample. Foods may be recommended or suggested based on the state of a person's mouth and the resulting classification or classifiers. Such methodology allows or enables individuals to identify at the time of dining, what to eat or drink and what to avoid in their intakes.

An individual may provide a sample by sipping a glass of water. A server such as the waiter or waitress may obtain the sample and run the sample through the appropriate classifier based on the meal and/or time of day. Once suggestions are retrieved, a system or module implementing the methodology of the present disclosure in one embodiment may filter out the food(s) that the individual is determined to be allergic to and present the individual with a list of suggested foods.

Figure 1:
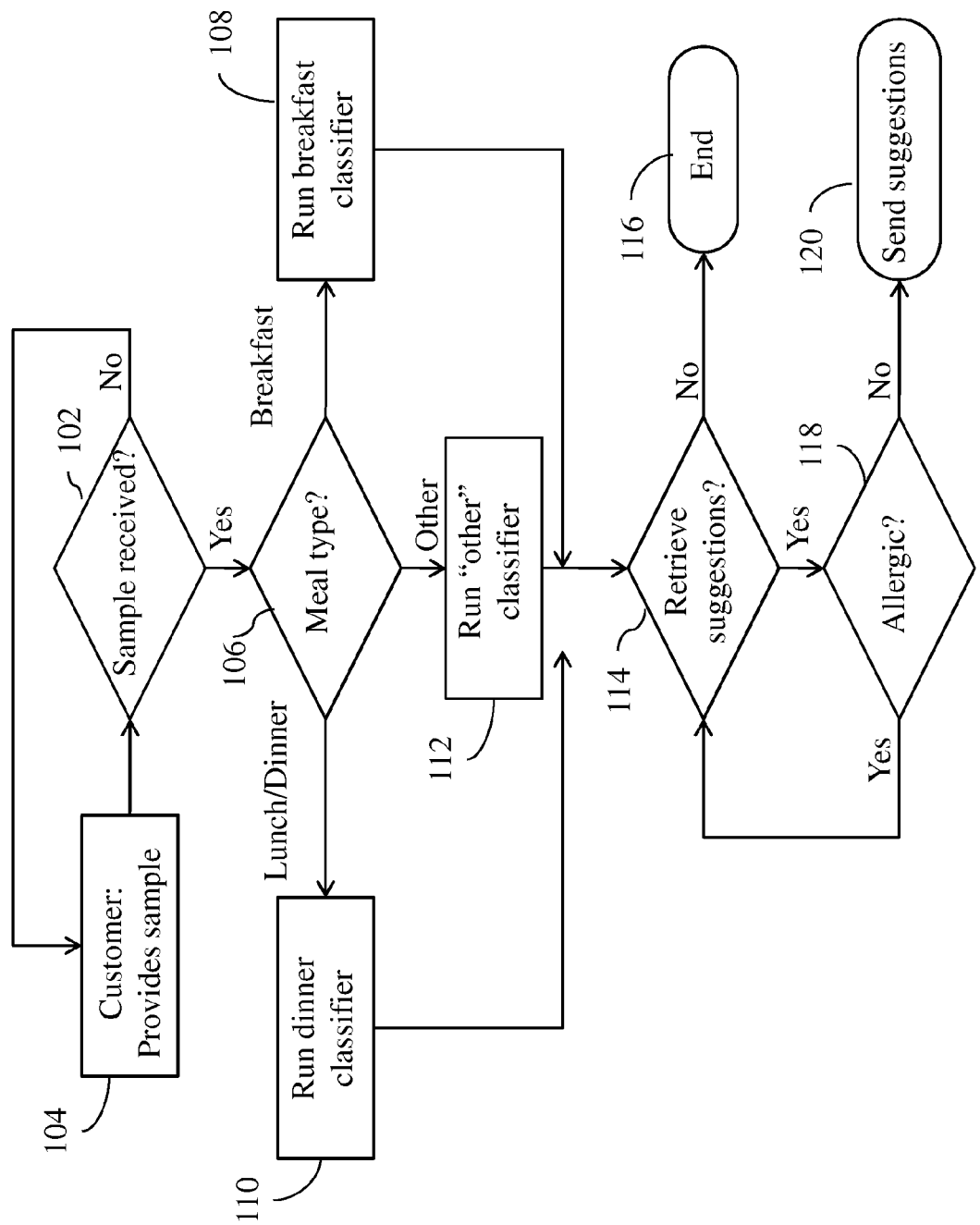
FIG. 1 is a flow diagram illustrating a method of generating a menu based on current user location and user provided sample in one embodiment of the present disclosure.

FIG. 1 is a flow diagram illustrating a method of generating a menu based on current user location and user provided sample in one embodiment of the present disclosure. At 102, sample is received from a customer as provided at 104. A sample, as described above, may be the customer's saliva, which for example, may be tested for food allergies. In another embodiment, the sample provided by the customer may be a list of restrictions and/or preferences. At 106, meal type the customer is interested is determined, for example, by the customer providing that information and/or from the time of the day. At 108, if the meal type is determined to be a breakfast, a breakfast classifier is run. At 110, if the meal type is determined to be a dinner, a dinner classifier is run. At 112, if the meal type is determined to be other than breakfast or dinner, an "other" classifier may be run.

The meal classifiers (e.g., breakfast classifier, dinner classifier, and other classifier) refer to routines which determine the subset of foods available at the current location which are appropriate to the determined meal classifier. If the determined food classifier is breakfast, then in step 108 the breakfast classifier will determine all of the food available from the user's current location that are appropriate for breakfast, e.g., omelets and toast, not soup and salads. In contrast, if the meal classifier were lunch or dinner, the dinner classifier would be invoked which would return a list of the foods available from the user's current location appropriate for lunch or dinner, e.g., soup and salads, but not omelets and toast. The "other" classifier, in step 112 may return a list of all available foods.

In one embodiment of the present disclosure, the list of foods available at the user's current location (e.g., a restaurant) is determined by first determining the user's current location (e.g, using the GPS feature of a smart mobile phone carried by the user), determining the food vendors located at or near this positions, and then retrieving a list of the foods available from these vendors. Such food lists could be obtained by looking up a given restaurant's menu, or a food store's (e.g., grocery store's) list of products.

At 114, the list of returned foods is checked. If the list is empty, such as might be the case if no appropriate foods were available for the user at the current location (e.g., if the user were in a candy store at breakfast time), then the logic would end at step 116.

Otherwise, at 118, it is determined, for instance, from the customer sample, whether the customer has a food allergy (or other dietary restrictions) that pertains to the suggested food. If the customer doest not have any restrictions, the retrieved suggestions may be provided as a customized menu. At 118, if it is determined that the customer is allergic or has other dietary restrictions, the suggested food list is modified further filtering the suggested foods to comply with the user's dietary restrictions. For example, if the user is allergic to walnuts, then if the current set of suggestions included a Waldorf salad (which includes walnuts), the Waldorf salad would be deleted from the suggestion list.

Figure 2:
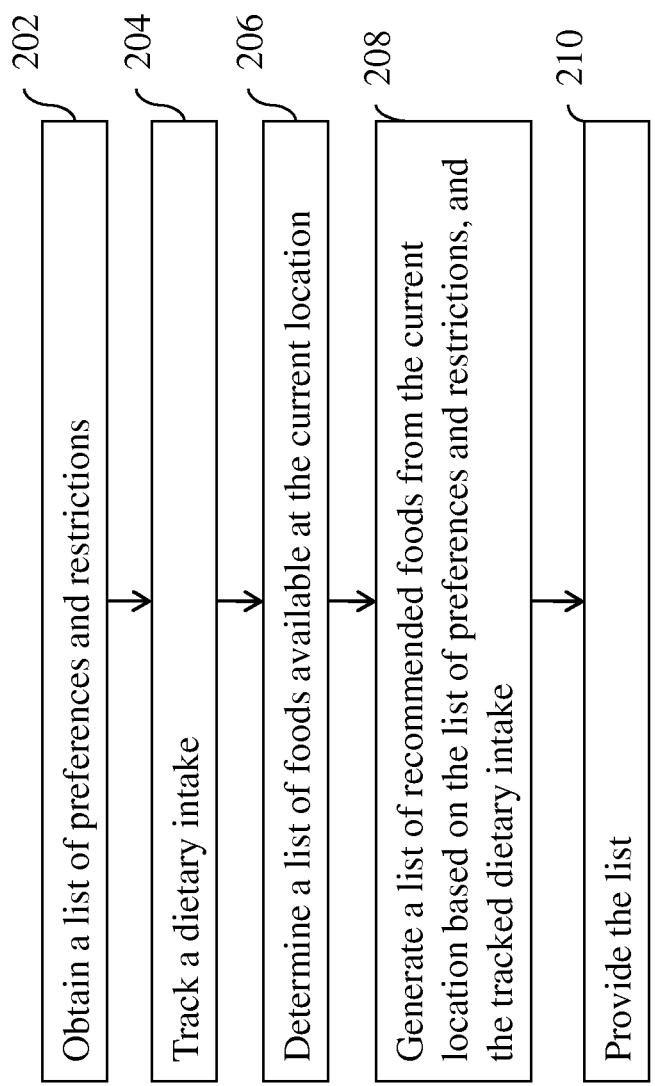
FIG. 2 is a flow diagram illustrating a method of generating a menu based on current user location and user preference and restriction in one embodiment of the present disclosure.

FIG. 2 is a flow diagram illustrating a method of generating a customized menu based on current user location and user preference and restriction in one embodiment of the present disclosure. At 202, a list of preferences and restrictions may be obtained. As an example, the preferences may include favorite foods, e.g., steak, and/or flavorings, spicy. The restrictions may include maximum and/or minimum caloric intake. The restrictions may also include maximum and/or minimum intake rates such as intake rates of cholesterol, salt, alcohol, and fat. The restrictions may further include allergies such as allergies to nuts, spices (e.g., garlic), or other food.

At 204, the dietary intake of a user is tracked. Tracking of the dietary intake may include tracking intake of calories, sugar, fat, alcohol and cholesterol, for example, based on the amount of food consumed so far. In one embodiment of the present disclosure, the user continually specifies the details of everything they consume, including the calories; each such specification is stored with an indication of the time the food or drink was consumed. Applications which enable such tracking include Loselt (http://www.loseit.com/). The tracking, for example, may also include indication of time and rate, e.g., 1000 calories consumed so far today, or 2 ounces of alcohol consumed in the last ½ hour. Those skilled in the art will appreciate that automatic methods of caloric intake are also possible, e.g., when the user obtains nourishment from an automatically controlled fluid delivery system.

At 206, a list of the foods available at the current location is determined. The food available at the current location, for example, may be determined by obtaining the current location, for example, by employing a location determining device such as a global positioning system, and identifying the restaurant or another food establishment located at the current location. The menu of the identified restaurant may be retrieved to determine the available food.

At 208, a list of recommended foods from the current location is generated based on the list of preferences, restrictions, and/or the current dietary intake, and the available food at the identified restaurant. At 210, the generated list may be provided as a customized menu for the user.

In one aspect, the generated list may be prioritized from most to least recommended food. In another aspect, the list may include annotated explanation of why certain available foods are not recommended. Yet in another aspect, the list of recommended foods may include suggested combinations of the available food, each combination fulfilling the specified list of preferences and restrictions given the current dietary intake. For example, one combination may have steak and coffee; another combination may have a large salad, spicy steamed vegetables plus cheese cake. Each combination would meet the preference/restriction criteria, and the user may then have several choices to select from. Still yet in another aspect, the list may include suggestions for future intake. For example, the list may specify that if only the soup and salad is chosen now, the user will be able to have a dish of ice cream later. In still further embodiment, the current location of the user need not be inside a specific restaurant or food establishment. The method of the present disclosure may detect the current location of the user and identified one or plurality of restaurants (or other food establishments) located near or within a predetermined proximity of the user's current location. The customized menu may be generated for each of those different restaurants identified in the proximity. In that way, a user may have a choice of which restaurant to enter based on the list of suggested foods in the different restaurants.

Figure 3:
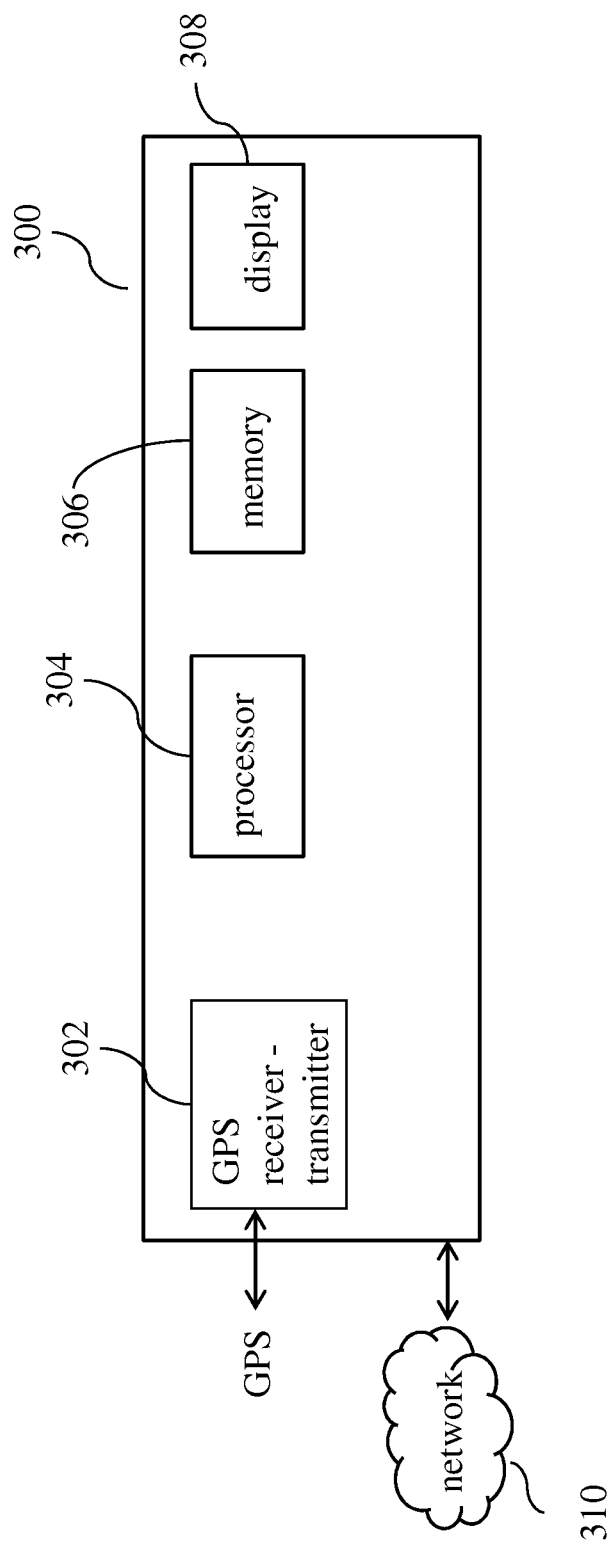
FIG. 3 is a diagram illustrating components of a system that may implement the methodologies of the present disclosure in one embodiment.

FIG. 3 is a diagram illustrating components of a system that may implement the methodologies of the present disclosure in one embodiment. A device 300 may be any computing device, for example, a portable device with location receiver/transmitter 302 such as GPS receiver/transmitter that can receive and transmit location information. The device 300 may include a processor or processing element 304, memory device 306, a display component 308, and input device for receiving user inputs on the device. The device may also include communication elements for communicating to a network 310 such as the Internet. An example of such portable devices includes, but is not limited to, a cellular phone or a smart phone. The processing element 304 may generate a customized menu associated with a user, for instance, as described above, based on the preferences and/or restrictions associated with the user and the food that is available to the user at the user's current location. The generated menu may be provided via the display component 308.

Yet in another embodiment, a device implementing a methodology of the present disclosure may be a computing device (non-portable or portable) such as a computer or a workstation or a laptop or any other computing device, that may be installed at a restaurant, and may generate a customized menu for its customer, based on the customer's input and the menu of food available at the restaurant. In this respect, the computing device need not include a location determining device, since the restaurant is usually stationary at one location.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of generating location-aware preference and restriction based customized menu, comprising:
   obtaining a list of preferences and restrictions;
   tracking a dietary intake;
   determining a current location of a user by a global positioning system receiver device;
   receiving information about a user's food allergy;
   determining a list of foods available at the current location;
   generating, by a processor, a list of recommended foods available from the current location based on the list of preferences and restrictions, the user's food allergy, and the tracked dietary intake;
   customizing a menu of a restaurant at the current location based on the list of recommended foods, wherein the menu is annotated with an explanation of one or more reasons for not recommending one or more of the foods available at the current location; and
   presenting the menu on a display device.

2. The method of claim 1, further including:
   providing the list.

3. The method of claim 1, wherein the preferences include one or more of favorite foods or flavorings or combinations thereof.

4. The method of claim 1, wherein the restrictions include one or more of maximum caloric intake, minimum caloric intake, maximum intake rate of cholesterol, minimum intake rate of cholesterol, maximum intake rate of salt, minimum intake rate of salt, maximum intake rate of alcohol, minimum intake rate of alcohol, maximum intake rate of fat, minimum intake rate of fat, food allergy or combinations thereof.

5. The method of claim 1, wherein the tracking of dietary intake includes tracking of calories, sugar, fat, alcohol or cholesterol, or combinations thereof.

6. The method of claim 1, wherein, the tracking of dietary intake includes tracking time and rate of the dietary intake.

7. The method of claim 1, wherein the generated list is prioritized from most to least recommended foods.

8. The method of claim 1, wherein the generated list of recommended foods includes suggested combinations of the available food, each combination meeting criteria specified in the list of preferences and restrictions given the current dietary intake.

9. The method of claim 1, wherein the generated list includes one or more suggestions for future intake given the current dietary intake.

10. A system for generating location-aware preference and restriction based customized menu, comprising:
    a display device;
    a global positioning system receiver;
    a processor coupled to the display device and the global positioning system receiver; and
    a module operable to execute on the processor and obtain a list of preferences and restrictions associated with a user and further operable to track a dietary intake, the processor further operable to receive information about a user's food allergy, the processor further operable to determine a list of foods available at current location as determined by the global positioning system receiver, and generate a list of recommended foods available from the current location based on the list of preferences and restrictions, the user's food allergy, and the tracked dietary intake, the processor further operable to customize a menu of a restaurant at the current location based on the list of recommended foods, and annotate the menu with an explanation of one or more reasons for not recommending one or more of the foods available at the current location, the processor further operable to present the menu on the display device.

11. A non-transitory computer readable storage medium storing a program of instructions executable by a machine to perform a method of generating location-aware preference and restriction based customized menu, the method comprising:

obtaining a list of preferences and restrictions;
tracking a dietary intake;
determining a current location of a user;
receiving information about a user's food;
determining a list of foods available at current location;
generating a list of recommended foods available from the current location based on the list of preferences and restrictions, the user's food allergy, and the tracked dietary intake;
customizing a menu of a restaurant at the current location based on the list of recommended foods, wherein the menu is annotated with an explanation of one or more reasons for not recommending one or more of the foods available at the current location; and
presenting the menu on a display device.

12. The computer readable storage medium of claim 11, wherein the preferences include one or more of favorite foods or flavorings or combinations thereof.

13. The computer readable storage medium of claim 11, wherein the restrictions include one or more of maximum caloric intake, minimum caloric intake, maximum intake rate of cholesterol, minimum intake rate of cholesterol, maximum intake rate of salt, minimum intake rate of salt, maximum intake rate of alcohol, minimum intake rate of alcohol, maximum intake rate of fat, minimum intake rate of fat, food allergy or combinations thereof.

14. The computer readable storage medium of claim 11, wherein the tracking of dietary intake includes tracking of calories, sugar, fat, alcohol or cholesterol, or combinations thereof.

15. The computer readable storage medium of claim 11, wherein, the tracking of dietary intake includes tracking time and rate of the dietary intake.

16. The computer readable storage medium of claim 11, wherein the generated list is prioritized from most to least recommended foods.

17. The computer readable storage medium of claim 11, wherein the generated list of recommended foods includes suggested combinations of the available food, each combination meeting criteria specified in the list of preferences and restrictions given the current dietary intake.

18. The computer readable storage medium of claim 11, wherein the generated list includes one or more suggestions for future intake given the current dietary intake.

* * * * *